United States Patent
Ebara

(10) Patent No.: US 6,675,601 B2
(45) Date of Patent: Jan. 13, 2004

(54) AIR CONDITIONER

(75) Inventor: Toshiyuki Ebara, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/272,630

(22) Filed: Oct. 17, 2002

(65) Prior Publication Data

US 2003/0074913 A1 Apr. 24, 2003

(30) Foreign Application Priority Data

Oct. 18, 2001 (JP) .......................... 2001-320804

(51) Int. Cl.$^7$ .......................... F25D 23/00; F25D 17/06
(52) U.S. Cl. .......................... 62/271; 62/94
(58) Field of Search .......................... 62/271, 94

(56) References Cited

U.S. PATENT DOCUMENTS

| | | | | |
|---|---|---|---|---|
| 4,887,438 A | * | 12/1989 | Meckler | 62/271 |
| 4,952,283 A | * | 8/1990 | Besik | 165/4 |
| 5,526,651 A | * | 6/1996 | Worek et al. | 62/271 |
| 5,758,511 A | * | 6/1998 | Yoho et al. | 62/271 |
| 5,771,707 A | * | 6/1998 | Lagace et al. | 62/271 |
| 6,199,388 B1 | * | 3/2001 | Fischer, Jr. | 62/90 |
| 6,205,797 B1 | * | 3/2001 | Maeda | 62/94 |
| 6,370,900 B1 | * | 4/2002 | Maeda | 62/271 |

OTHER PUBLICATIONS

Dinnage et al, Method for Heat and Humidity Exchange Between Two Air Streams and Apparatus Therefor, Sep. 19, 2002, US PGP, US 2002/0129614 A1.*

Makizono et al, Accumulator Module, Jun. 27, 2002, US PGP, US 2002/0078702 A1.*

Akio Kodama, et al., "Desiccant Air Conditioning Process", Journal of JSES (Japan Solar Energy Sicuety), vol. 27, No. 2, pp. 1–22, JSES Mar. 21, 2001.

Tsutomu Hirose, et al., "Desiccant Air Conditioning System Using Solar Energy", Journal of JSES (Japan Solar Energy Society), vol. 27, No. 2, pp. 19–26, JSES, Mar. 31, 2001.

WeiLi Jin, "Implementation Examiner of High Performance Desiccant Air Conditioning System", Heating Piping and Airconditioning, No. 10, pp. 1–5, Japan Industrial Publishing Co., Ltd., Oct. 2001.

* cited by examiner

Primary Examiner—William C. Doerrler
Assistant Examiner—Filip Zec
(74) Attorney, Agent, or Firm—Darby & Darby

(57) ABSTRACT

An air conditioner including an air supply passage for introducing outdoor air into a room, an air exhaust passage for exhausting indoor air, a rotary dehumidifier that is a rotary drum structure having an air passage formed of a material impregnated with an adsorbent, the rotary dehumidifier being arranged such that one half thereof is disposed in the air supply passage for dehumidifying by adsorption a supply air which is the introduced outdoor air and the other half thereof is disposed in the air exhaust passage for regenerating the adsorbent with use of exhaust air which is the exhausted indoor air as a heat source, a regenerative heater for heating the exhaust air before flowing into the rotary dehumidifier to a temperature required for regenerating the adsorbent of the rotary dehumidifier, a sensible heat exchanger for causing a sensible heat exchange between the supply air dehumidified at the rotary dehumidifier and the exhaust air before flowing into the regenerative heater and a refrigerating device operated with a refrigerating cycle which comprises a high-pressure gas cooling device for cooling a refrigerant in high-pressure side, an expansion valve and an evaporator for cooling the room, wherein an exhaust heat from the high-pressure gas cooling device of the refrigerating device is employed as a heat source of the regenerative heater.

9 Claims, 8 Drawing Sheets

AIR CONDITIONER

CROSS-REFERENCE TO RELATED APPLICATION

This application is related to Japanese Patent Application No. 2001-320804 as filed on Oct. 18, 2001, whose priority is claimed under 35 USC § 119, the disclosure of which is incorporated by reference in its entirety.

BACKGROUND OF THE INVENTION

1. Field of the Invention

The present invention relates to an air conditioner, and more particularly to a novel air conditioner combined a desiccant air conditioner with a refrigerating device for cooling a room by a normal refrigerating cycle.

2. Description of Related Art

A typical desiccant air conditioner 100 that is conventionally well-known has a construction shown in FIG. 7. In FIG. 7, solid line arrows represent airflow of outdoor air (hereinafter referred to as supply air) drawn from the outside of a house or building into the room, while broken line arrows represent airflow of indoor air (hereinafter referred to as exhaust air) exhausted from the room to the outside. Moreover, the desiccant air conditioner mentioned above is described in, for example, Akio KODAMA, et al, "Desiccant Air Conditioning Process", Journal of JSES (JAPAN SOLAR ENERGY SOCIETY), Vol. 27, No. 2, pages 2–11, JSES, Mar. 31, 2001; Tsutomu HIROSE, et al, "Desiccant Air Conditioning System Using Solar Energy", Journal of JSES (JAPAN SOLAR ENERGY SOCIETY), Vol. 27, No. 2, pages 19–26, JSES, Mar. 31, 2001; and WeiLi Jin, "Implementation Example of High Performance Desiccant Air Conditioning System", Heating Piping and Air Conditioning, No. 10, pages 1–5, Japan Industrial Publishing Co., Ltd., October 2001.

As shown in FIG. 7, the desiccant air conditioner 100 is provided with an air supply passage 3 for directing the outdoor air into a room 2 and an air exhaust passage 4 for exhausting the indoor air. The air supply passage 3 and the air exhaust passage 4 are arranged so as to be adjacent to each other.

Arranged successively from the outside to the inside of the room 2 in the air supply passage 3 are a supply fan 31, one half 51 of a rotary dehumidifier 5, one half 61 of a rotary sensible heat exchanger 6 and a humidifier 7, while arranged successively in the air exhaust passage 4 are an exhaust fan 41, the other half 52 of the rotary dehumidifier 5, a regenerative heater 101, the other half 62 of the rotary sensible heat exchanger 6 and a humidifier 8.

The rotary dehumidifier 5 is arranged so as to extend over the air supply passage 3 and the air exhaust passage 4 which are adjacent to each other, as shown in FIG. 7. Consequently, the one half 51 thereof is positioned in the air supply passage 3, while the other half 52 is positioned in the air exhaust passage 4. This rotary dehumidifier 5 is a rotary rotor having a honeycomb airflow path that is made of a sheet-like material obtained by impregnating glass fiber as base material with silica gel. Thus, the rotary dehumidifier 5 is constructed so as to contact the passing air with the sheet-like material efficiently. The rotary dehumidifier 5 adsorbs water vapors in the passing supply air for performing a dehumidification at the one half 51 in the air supply passage 3, while dehumidifies an adsorbent by the passing heated high-temperature exhaust air at the other half 52 in the air exhaust passage 4 for recycling the adsorbent.

The rotary sensible heat exchanger 6 is a rotary rotor having a honeycomb airflow path formed using an aluminum plate. The rotary sensible heat exchanger 6 is constructed such that sensible heat exchange occurs, via the aluminum plate forming the honeycomb airflow path, between the supply air passing through the one half 61 in the air supply passage 3 and the exhaust air passing through the other half 62 in the air exhaust passage 4.

The regenerative heater 101 heats the exhaust air with hot water as a heat source, the hot water being supplied from a hot water tank 102 that stores hot water heated by a hot water boiler or the like. The regenerative heater 101 further heats the exhaust air already heated by the other half 62 of the rotary sensible heat exchanger 6. Numeral 103 designates a hot water circulating pump.

Further, the humidifiers 7 and 8 spray water such as tap water or the like for humidifying the passing supply air or exhaust air.

The operation of the desiccant air conditioner 100 having the above-mentioned construction will be explained hereinbelow with reference to an air chart shown in FIG. 8. Air states of $A_1$ to $A_4$ and $B_1$ to $B_5$ in FIG. 8 respectively represent the air states at the positions marked with $A_1$ to $A_4$ and $B_1$ to $B_5$ in FIG. 7. Also in FIG. 8, each solid line represents the change in the state of the supply air introduced into the room 2 from the outside, while each broken line represents the change in the state of the exhaust air exhausted from the room 2 into the outside.

The outdoor air (supply air) $A_1$ in the outside (for example, dry bulb temperature of 35° C., relative humidity $\phi$ of 40%) is transported to the rotary dehumidifier 5 by the supply fan 31. This supply air is dehumidified by the one half 51 of the rotary dehumidifier 5. At this time, heat of adsorption is generated at the one half 51. As a result, this supply air is dehumidified at the one half 51 of the rotary dehumidifier 5 without being accompanied by an energy change, thereby reaching the point $A_2$ (for example, dry bulb temperature of about 60° C., relative humidity $\phi$ of about 5%).

The dehumidified supply air $A_2$ is cooled in the one half 61 of the rotary sensible heat exchanger 6 to the point $A_3$ (for example, dry bulb temperature of about 20° C., relative humidity $\phi$ of about 40%) by a cold heat of the exhaust air flowing into the other half 62 with the state of the point $B_2$ (for example, dry bulb temperature of about 19.5° C., relative humidity $\phi$ of about 100%). The air at the point $A_3$ is humidified by the humidifier 7 to become a cool air at the point $A_4$ (for example, dry bulb temperature of about 12° C., relative humidity $\phi$ of about 100%), and then supplied into the room 2. It is to be noted that, between these points A3 and $A_4$, the dry bulb temperature of the supply air is lowered by latent heat cooling brought by the humidification, but there is no energy change.

On the other hand, the exhaust air $B_1$ (for example, dry bulb temperature of 27° C., relative humidity $\phi$ of 50%) is cooled by latent heat of vaporization of water in the humidifier 8 to reach the point $B_2$ (for example, dry bulb temperature of about 19.5° C., relative humidity $\phi$ of about 100%). The exhaust air at the point $B_2$ is heated in the other half 62 of the rotary sensible heat exchanger 6 to the point $B_3$ (for example, dry bulb temperature of about 50° C., relative humidity $\phi$ of about 12%) by the heat of the supply air flowing into the one half 61 and having state of the point $A_3$ (for example, dry bulb temperature of about 60° C., relative humidity $\phi$ of about 5%). The exhaust air at the point $B_3$ is heated to the point $B_4$ (for example, dry bulb temperature of about 80° C., relative humidity φ of about 5%) in the regenerative heater 101. The exhaust air at the point $B_4$ heats the adsorbent for dehumidifying the same in the other half 52 of the rotary dehumidifier 5, while the exhaust air itself is humidified to reach the point $B_5$ (for example, dry bulb temperature of about 42° C., relative humidity φ of about 40%), and then discharged to the outside.

Since the conventional desiccant air conditioner 100 has the construction as described above, the heat quantity Qip (i.e., input heat quantity (kcal)) consumed for cooling equals to the heat quantity supplied to the regenerative heater 101. This heat quantity Qip is obtained by the following equation:

$$Qip = \text{(flow rate of supplied and exhausted air)} \times (Hb_5 - Hb_3)$$

wherein $Hb_5$ represents an enthalpy (kcal/kg) of the exhaust air at the point $B_5$ and $Hb_3$ represents an enthalpy (kcal/kg) of the exhaust air at the point $B_3$. On the other hand, the cooling capability Qop (i.e., cooling heat quantity (kcal) that is output heat quantity (kcal)) is obtained by the following equation:

$$Qop = \text{(flow rate of supplied and exhausted air)} \times (Hb_1 - Ha_4)$$

wherein $Hb_1$ represents an enthalpy (kcal/kg) of the exhaust air at the point $B_1$ and $Ha_4$ represents an enthalpy (kcal/kg, $Ha_4 = Ha_3$) of the exhaust air at the point $A_4$, and the energy efficiency of Qop/Qip is approximately 1. On the other hand, the energy efficiency for cooling in a common air conditioner to which a refrigerating cycle is adopted is 2 or more (for reference, the energy efficiency for heating is 3 or more). Accordingly, there is a problem that the energy efficiency of the conventional desiccant air conditioner is low compared to that of the common air conditioner.

SUMMARY OF THE INVENTION

The present invention is accomplished in view of the above circumstances, and aims to provide a novel air conditioner having a remarkably improved energy efficiency by combining a desiccant air conditioner with a refrigerating device for cooling a room by a normal refrigerating cycle.

In order to accomplish the above object, the air conditioner of the present invention comprises an air supply passage for introducing outdoor air into a room, an air exhaust passage for exhausting indoor air, a rotary dehumidifier that is a rotary drum structure having an air passage formed of a material impregnated with an adsorbent, the rotary dehumidifier being arranged such that one half thereof is disposed in the air supply passage for dehumidifying by adsorption a supply air which is the introduced outdoor air and the other half thereof is disposed in the air exhaust passage for regenerating the adsorbent with use of exhaust air which is the exhausted indoor air as a heat source, a regenerative heater for heating the exhaust air before flowing into the rotary dehumidifier to a temperature required for regenerating the adsorbent of the rotary dehumidifier, a sensible heat exchanger for causing a sensible heat exchange between the supply air dehumidified at the rotary dehumidifier and the exhaust air before flowing into the regenerative heater and a refrigerating device operated with a refrigerating cycle which comprises a high-pressure gas cooling device for cooling a refrigerant in high-pressure side, an expansion valve and an evaporator for cooling the room, wherein an exhaust heat from the high-pressure gas cooling device of the refrigerating device is employed as a heat source of the regenerative heater.

By this construction, the heat quantity consumed by the refrigerating device almost equals to a heat quantity (input heat quantity (kcal)) q consumed by the air conditioner of the present invention. If the heat quantity Qip consumed by the conventional desiccant air conditioner equals to the heat quantity (input heat quantity) q consumed by the air conditioner of the invention, three-fold (i.e., 3×q) or more energy is supplied to the regenerative heater in the present invention, since the energy efficiency for heating in the refrigerating device utilizing the conventional refrigerating cycle is 3 or more. Further, the cooling heat quantity (kcal) in the desiccant air conditioner approximately equals to the heat quantity supplied to the regenerative heater, resulting in that the cooling heat quantity (kcal) Qo by the desiccant cooling cycle of the present invention becomes about three times as large as the cooling heat quantity (kcal) Qop in the conventional desiccant air conditioner. Further, in the air conditioner of the present invention the evaporator arranged in the room performs the same cooling operation as that performed by the refrigerating device utilizing the conventional general refrigerating cycle. The cooling heat quantity (kcal) $q_0$ of this cooling operation is about double the consumed heat quantity (input heat quantity) q. Accordingly, the cooling heat quantity (kcal) in the air conditioner of the present invention is five times as large as the input heat quantity q, i.e., the energy efficiency is about 5. This energy efficiency is double or more that of 2 or more of the conventional common air conditioner.

In the air conditioner as described above, the sensible heat exchanger may be a rotary sensible heat exchanger. This construction can increase the energy efficiency without greatly changing the structure of the conventional desiccant air conditioner.

The sensible heat exchanger may be a cross-flow sensible heat exchanger. This can omit the rotational energy required for the sensible heat exchanger, thereby further enhancing the energy efficiency.

The cross-flow sensible heat exchanger means here a heat exchanger that causes a sensible heat exchange between the exhaust air and the supply air by crossly flowing the exhaust air and the supply air via a partitioning wall.

Further, the air conditioner described above may have a humidifier for humidifying the exhaust air before flowing into the sensible heat exchanger. This can decrease the dry bulb temperature of the exhaust air flowing into the sensible heat exchanger, thereby being capable of further cooling the outdoor air cooled by the sensible heat exchanger to be supplied to the room.

Moreover, the regenerative heater is preferably the high-pressure gas cooling device in the refrigerating device, and preferably constructed such that the flow of the refrigerant in the high-pressure gas cooling device and the flow of the exhaust air passing through the high-pressure gas cooling device become opposite to each other. By this construction, the exhaust air flown into the rotary dehumidifier can have a temperature required for the regeneration of the adsorbent even if the refrigerant outlet temperature of the high-pressure gas cooling device is set low. Accordingly, a pressure at the high pressure side of the refrigerating device can be set low, thereby being capable of further enhancing the energy efficiency.

Moreover, the refrigerating device may have a high-pressure gas cooling device for cooling the high-pressure refrigerant under a supercritical pressure. This construction enables to easily supply to the regenerative heater a high-temperature heat source required for the regeneration of the adsorbent.

Further, the refrigerant charged in the refrigerant circuit may be $CO_2$. This construction enables to use a natural refrigerant that can easily bring the high-temperature heat source having no combustibility and toxicity for regenerating the adsorbent.

Moreover, the refrigerating device may have high-low-pressure heat exchanger for causing a heat exchange between the high-pressure refrigerant that has already passed through the high-pressure gas cooling device and a low-pressure refrigerant that has already passed through the evaporator. This construction can further enhance the energy efficiency of the refrigerating device, thereby further enhancing the energy efficiency of the air conditioner of the present invention.

Further, the drain water generated by the cooling operation of the evaporator can be utilized as the water for the humidification at the humidifier, thereby being capable of saving water for use in the humidification. Furthermore, a water source for humidification can be simplified.

Additionally, the air conditioner as described above may further comprise an exhaust fan and a supply fan, and the exhaust fan, the supply fan and a compressor of the refrigerating device each has a variable speed of rotation. By this construction, the capability of the air conditioner of the invention can be made variable corresponding to the change in the cooling load in the room.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An air conditioner according to an embodiment 1 of the invention will be explained in detail with reference to FIGS. 1 to 4. It is to be noted that, in these figures, the same elements as those in the conventional desiccant air conditioner are marked with the same numerals and the their explanations are omitted.

The air conditioner according to the embodiment 1 include the desiccant air conditioner 1 combined with a refrigerating device 10 that cools a room by a normal refrigerating cycle.

Figure 7:
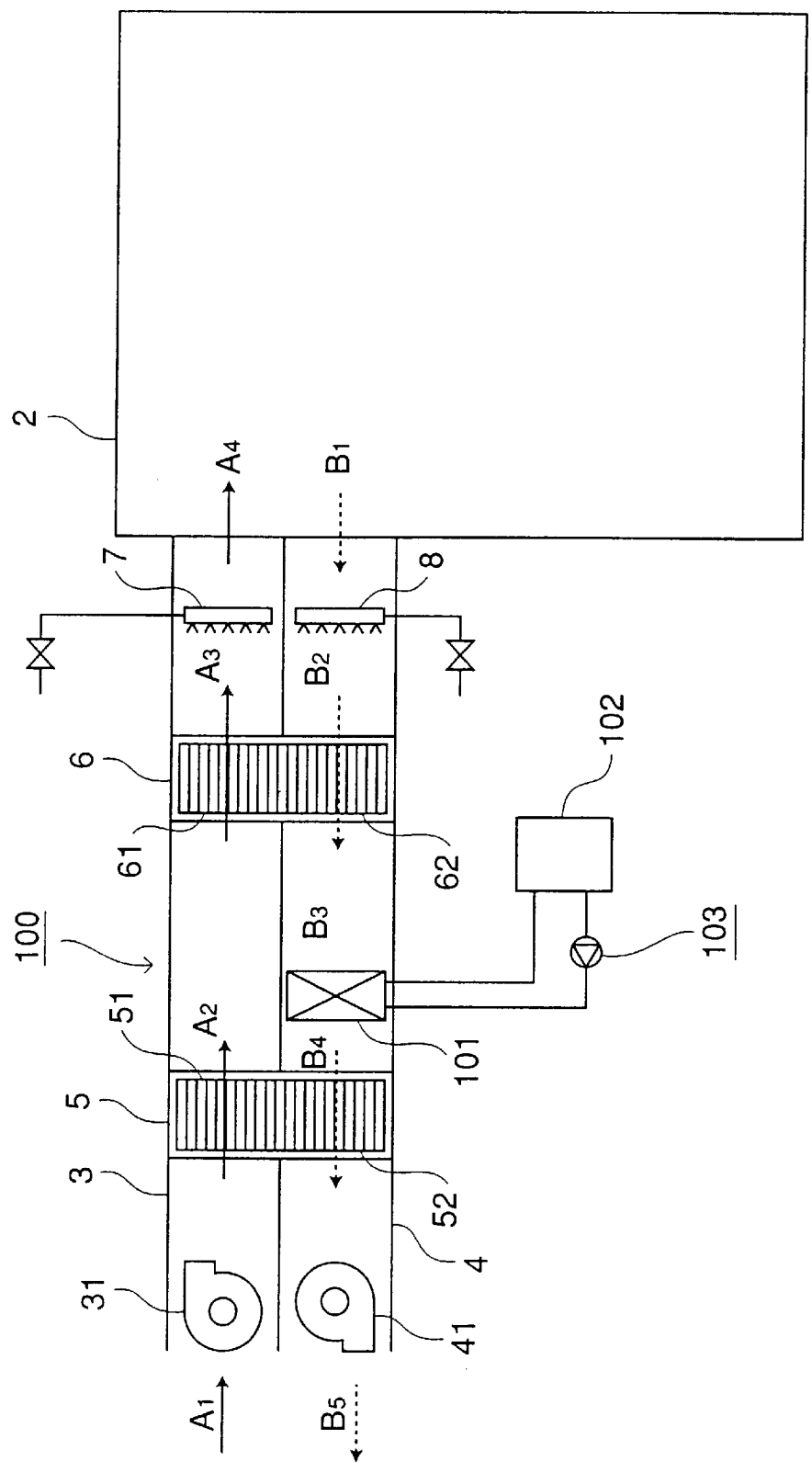
FIG. 7 is a view for explaining a construction of a conventional well-known typical desiccant air conditioner.

The desiccant air conditioner 1 has an air supply passage 3 and air exhaust passage 4 positioned adjacent to each other like the conventional one shown in FIG. 7. Like the conventional one, the desiccant air conditioner 1 further has a rotary dehumidifier expanding over the air supply passage 3 and the air exhaust passage 4 at the outdoor side in the air supply passage 3 and air exhaust passage 4 and a rotary sensible heat exchanger 6 expanding over the air supply passage 3 and the air exhaust passage 4 at the room 2 side in the air supply passage 3 and the air exhaust passage 4. A regenerative heater 12 is further arranged between the rotary dehumidifier 5 and the rotary sensible heat exchanger 6, and a humidifier 8 is arranged at the room 2 side with respect to the rotary sensible heat exchanger 6.

The refrigerating device 10 has charged therein $CO_2$ as a refrigerant, and has a refrigerant circuit formed by successively connecting a two-stage compressor 11, a high-pressure gas cooling device 12 for cooling a high-pressure gas refrigerant, high-low-pressure heat exchanger 13 for causing a heat exchange between the high-pressure gas refrigerant that has already passed through the high-pressure gas cooling device 12 and low-pressure gas refrigerant, an expansion valve 14, an evaporator 15, the heat exchanger between high-pressure refrigerant and low-pressure refrigerant 13, and an accumulator 16. The evaporator 15 is arranged in the room 2, and the room 2 is also cooled by this evaporator 15. The high-pressure gas cooling device 12 is the regenerative heater 12 itself.

A drain tank 21 is disposed below the evaporator 15 for supplying the drain water to the humidifier 8 by a pump 22 as water for humidification.

Figure 1:
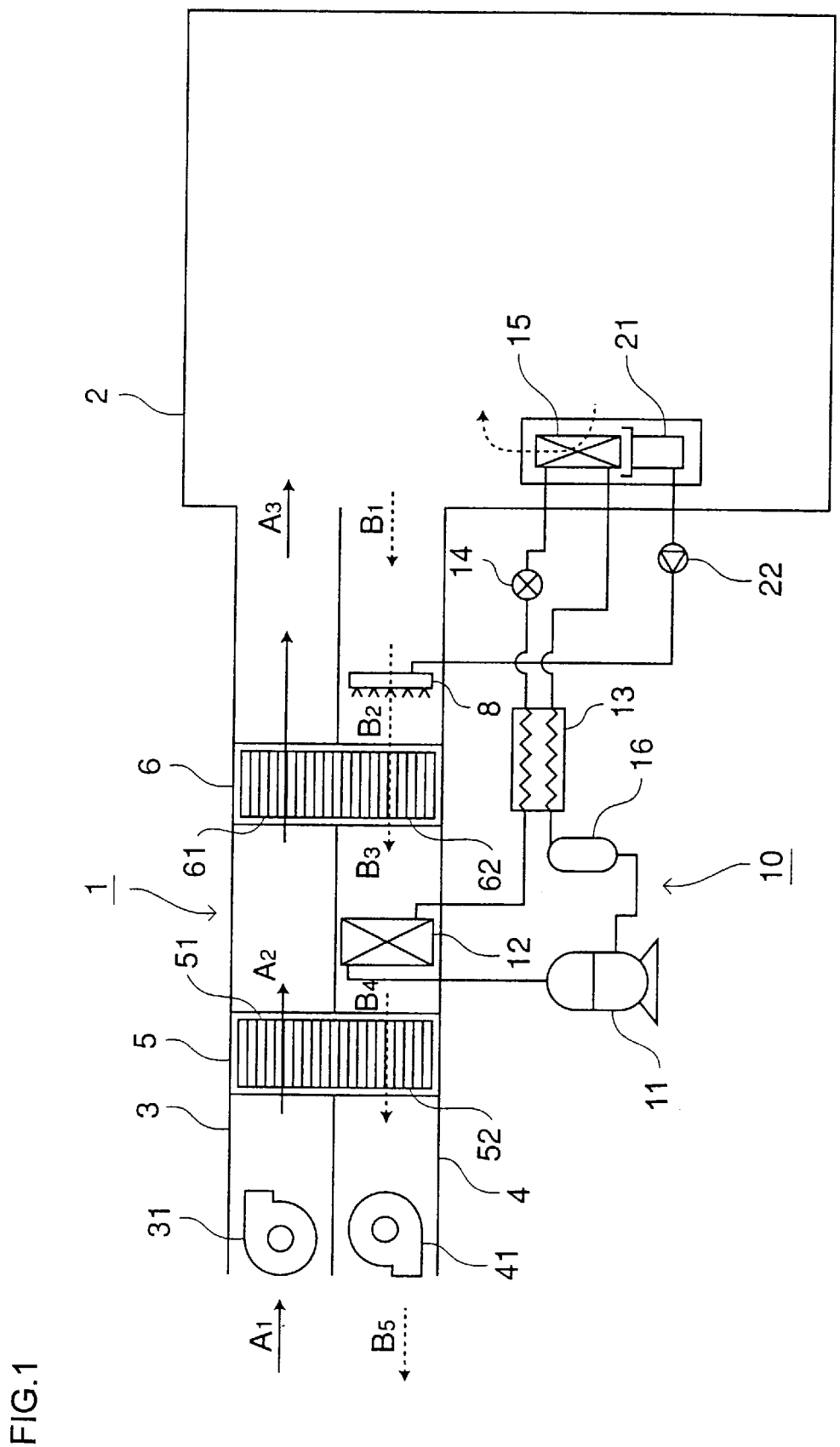
FIG. 1 is a view for explaining a construction of an air conditioner according to an embodiment 1 of the present invention.
Figure 2:
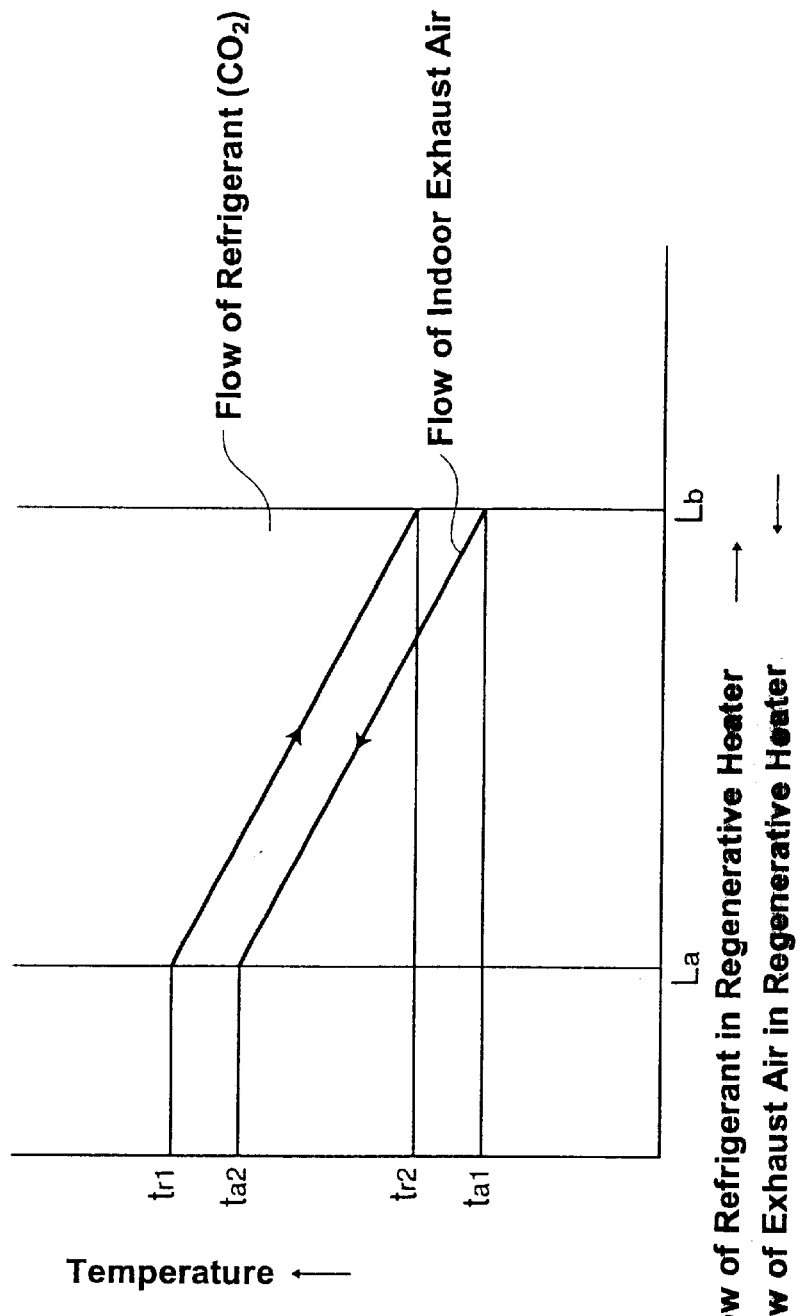
FIG. 2 is a view for explaining a heat exchanging state at a regenerative heater in the air conditioner.

The regenerative heater 12 (the high-pressure gas cooling device 12 in the refrigerating device 10) in the desiccant air conditioner 1 is constructed such that the flow of the refrigerant $CO_2$ (from La to Lb in FIG. 2) and the flow of the exhaust air (from Lb to La in FIG. 2) are opposite to each other as shown in FIG. 2. Specifically, the refrigerant flows in at the inlet temperature $tr_1$ (e.g., about 110° C.) and flows out at the outlet temperature $tr_2$ (e.g., about 60° C.), while the exhaust air flows in at the inlet temperature $ta_1$ (e.g., about 50° C.) and can be made to be flown out at the outlet temperature $ta_2$ (e.g., about 80° C.) that is higher than the refrigerant outlet temperature $tr_2$. In other words, the refrigerant outlet temperature $tr_2$ can be made lower than the required exhaust air outlet temperature $ta_2$, whereby the refrigerant temperature at the high-pressure side required for the regeneration of the adsorbent can be controlled to be low.

Figure 8:
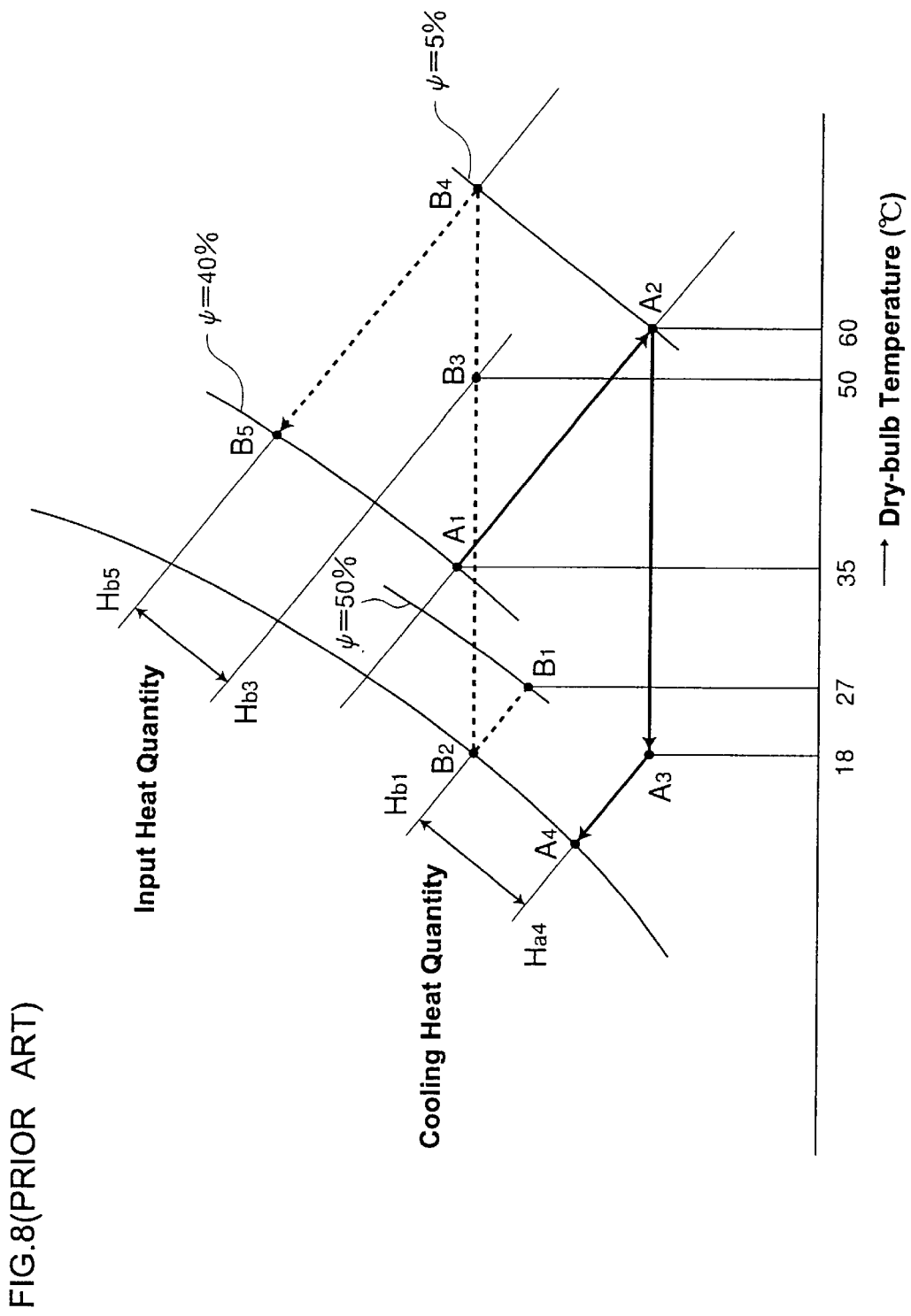
FIG. 8 is an air chart for explaining a cooling operation of the desiccant air conditioner.

The air conditioner according to the embodiment 1 has the construction as described above. Accordingly, the desiccant air conditioner 1 is different from the desiccant air conditioner 100 shown in the above-mentioned FIGS. 7 and 8 in the following three points:

1. The heat source of the regenerative heater 12 is the exhaust heat from the high-pressure gas cooling device in the refrigerating device 10;
2. The humidifier 7 is not provided; and
3. The drain water generated in the evaporator 15 is utilized for water supplied to the humidifier 8.

Figure 3:
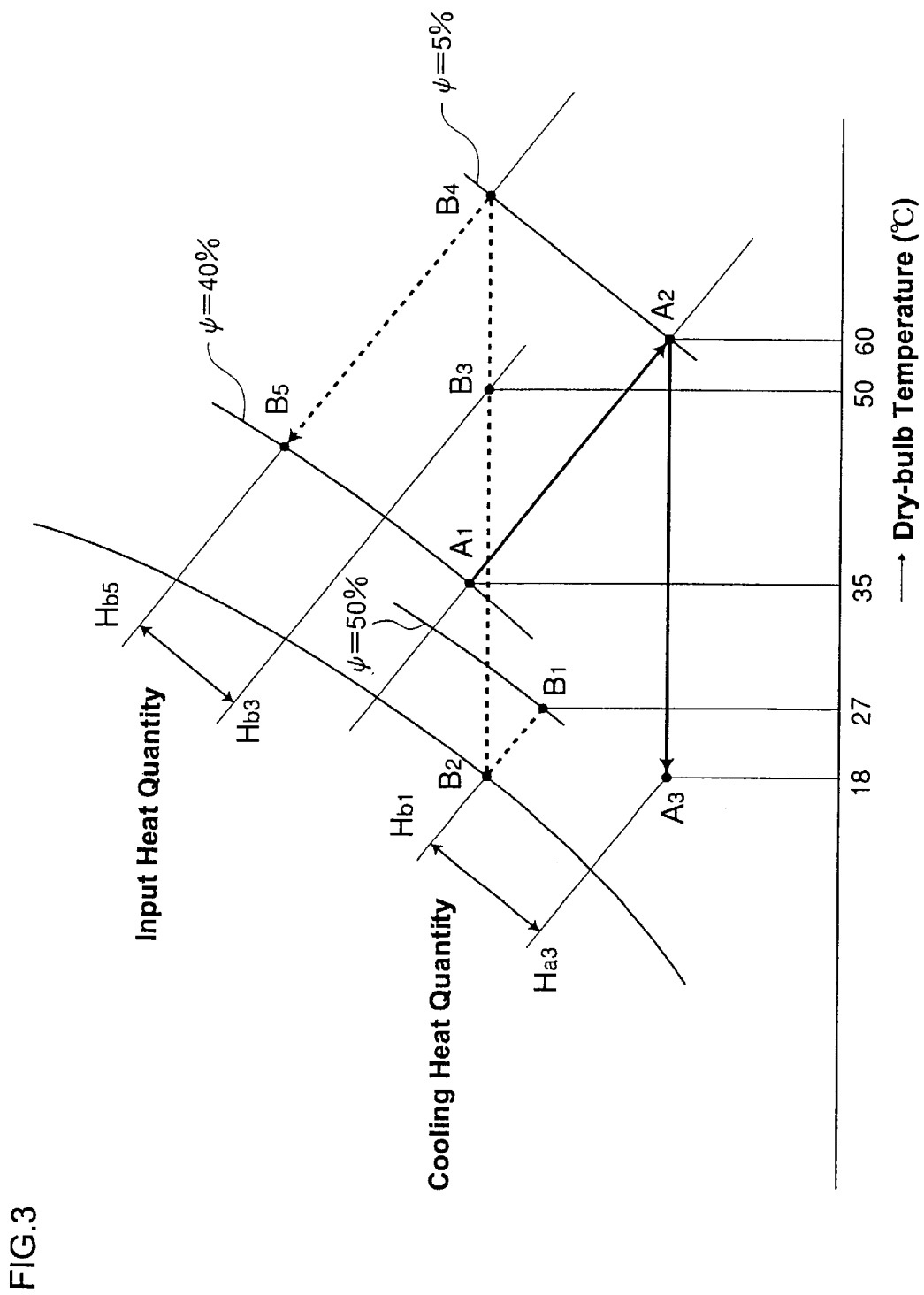
FIG. 3 is a Mollier chart for explaining an energy efficiency of a desiccant air conditioner constructing the air conditioner.

The operation of the air conditioner of the embodiment 1 having the above-mentioned construction will subsequently be explained hereinbelow with reference to the air chart shown in FIG. 3 and Mollier chart shown in FIG. 4. Air states of $A_1$ to $A_3$ and $B_1$ to $B_5$ in FIG. 3 respectively represent the air states at the positions marked with $A_1$ to $A_3$ and $B_1$ to $B_5$ in FIG. 1. Also in FIG. 3, each solid line represents the change in the state of the supply air introduced into the room 2 from the outside, while each broken line represents the change in the state of the exhaust air discharged from the room 2 into the outside.

The outdoor air (supply air) $A_1$ in the outside (for example, dry bulb temperature of 35° C., relative humidity φ of 40%) is transported to the rotary dehumidifier 5 by a supply fan 31. This supply air is dehumidified by the one half 51 of the rotary dehumidifier 5. At this time, heat of adsorption is generated at the one half 51. As a result, this supply air is dehumidified at the one half 51 of the rotary dehumidifier 5 without being accompanied by an energy change, thereby reaching the point $A_2$ (for example, dry bulb temperature of about 60° C., relative humidity φ of about 5%).

The dehumidified supply air $A_2$ is cooled in the one half 61 of the rotary sensible heat exchanger 6 to the point $A_3$ (for example, dry bulb temperature of about 20° C., relative humidity φ of about 40%) by a cold heat of the exhaust air flowing into the other half 62 with the state of the point $B_2$ (for example, dry bulb temperature of about 19.5° C., relative humidity φ of about 100%), and then, supplied into the room 2. The supply air at the point $A_3$ is supplied into the room 2 without being humidified.

On the other hand, the exhaust air $B_1$ (for example, dry bulb temperature of 27° C., relative humidity φ of 50%) is cooled by a latent heat of vaporization of water in the humidifier 8 to reach the point $B_2$ (for example, dry bulb temperature of about 19.5° C., relative humidity φ of about 100%). The exhaust air at the point $B_2$ is heated in the other half 62 of the rotary sensible heat exchanger 6 to the point $B_3$ (for example, dry bulb temperature of about 50° C., relative humidity φ of about 12%) by a heat of the supply air flowing into the one half 61 with the state of the point $A_3$ (for example, dry bulb temperature of about 60° C., relative humidity φ of about 5%). The exhaust air at the point $B_3$ is heated to the point $B_4$ (for example, dry bulb temperature of about 80° C., relative humidity φ of about 5%) at the regenerative heater 12. The exhaust air at the point $B_4$ heats the adsorbent for dehumidifying the same in the other half 52 of the rotary dehumidifier 5, while the exhaust air itself is humidified to reach the point $B_5$ (for example, dry bulb temperature of about 42° C., relative humidity φ of about 40%), and then discharged to the outside.

Figure 4:
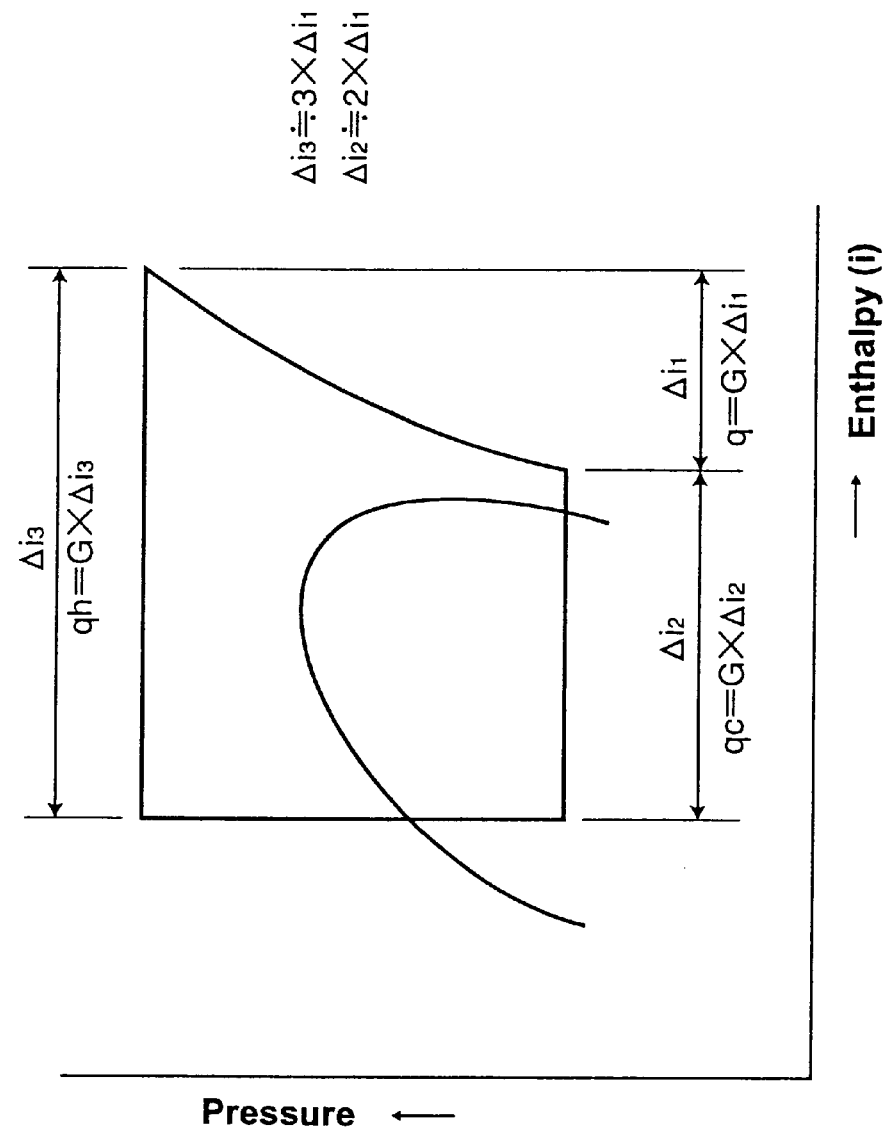
FIG. 4 is an air chart for explaining a cooling operation of a refrigerating device that provides a heat source to the regenerative heater of the air conditioner.

In the embodiment 1, the refrigerating device 10 outputs the cooling capability $q_c$ ($q_c$=about 2×q) that is double the input heat quantity q (kcal) of the compressor 11, and dissipates from the high-pressure gas cooling device 12 the heat quantity $q_h$ ($q_h$=about 3×q) that is three times as large as the input heat quantity q of the compressor 11, as shown in the Mollier chart of FIG. 4. Specifically, the following equations are established:

$$q = G \times \Delta i_1$$

$$q_c = G \times \Delta i_2 = \text{about } 2 \times G \times \Delta i_1 = \text{about } 2 \times q$$

$$q_h = G \times \Delta i_3 = \text{about } 3 \times G \times \Delta i_1 = \text{about } 3 \times q$$

It is to be noted that the symbol G represents the refrigerant flow rate.

Therefore, the heat quantity Qi at the regenerative heater 12 in the desiccant air conditioner 1 becomes as follows:

$$Qi = q_h = \text{about } 3 \times G \times \Delta i_1 = \text{about } 3 \times q$$

Since the cooling heat quantity Qo equal to this heat quantity can be obtained, this cooling heat quantity Qo can be represented as follows:

$$Qo = Qi = \text{about } 3 \times G \times \Delta i_1 = \text{about } 3 \times q$$

As described above, the cooling capability of the air conditioner in the embodiment 1 becomes $q_c$+Qo=about 5×q. This means that the energy efficiency is about 5. Accordingly, the energy efficiency can remarkably be improved compared to the energy efficiency of about 1 of the conventional desiccant air conditioner 100 and that of about 2 of the air conditioner employing the conventional general refrigerating cycle.

The air conditioner in this embodiment 1 adopts the rotary sensible heat exchanger 6 as the sensible heat exchanger, resulting in that it has many points common to the conventional desiccant air conditioner 100. Accordingly, the energy efficiency can be enhanced without adding a great change.

According to the air conditioner of the embodiment 1, the exhaust air is humidified before it flows into the other half 62 of the rotary sensible heat exchanger 6 in the air exhaust passage 4 for reducing the dry bulb temperature of this exhaust air. Therefore, the supply air passing through the one half 61 of the rotary sensible heat exchanger 6 can be cooled further compared to the case where the exhaust air is not humidified, thereby being capable of further enhancing the energy efficiency.

Additionally, the refrigerating device 10 is provided with the high-pressure gas cooling device 12 for cooling the high-pressure refrigerant under a supercritical pressure as the regenerative heater 12, whereby a high-temperature heat source required for the regeneration of the adsorbent can easily be supplied to the regenerative heater 12. Further, the regenerative heater 12 is constructed such that the refrigerant flow and the flow of the exhaust air become opposite to each other, so that the temperature of the exhaust air flown into the rotary dehumidifier 5 can easily be increased to a high temperature required for regenerating the adsorbent even if the refrigerant outlet temperature $tr_2$ of the regenerative heater 12 is set low. Consequently, the high pressure of the refrigerating device 10 can be set low, thereby being capable of further enhancing the energy efficiency. Moreover, the refrigerating device 10 employs $CO_2$ as the refrigerant, thereby being capable of easily obtaining the high-temperature heat source having no combustibility and toxicity for regenerating the adsorbent.

The refrigerating device 10 is further provided with the heat exchanger between high-pressure refrigerant and low-pressure refrigerant 13 for performing a heat exchange between the high-pressure refrigerant that has already passed through the high-pressure gas cooling device 12 and the low-pressure refrigerant that has already passed through the evaporator 15, with the result that the energy efficiency of the refrigerating device 10 can be enhanced, and hence, the energy efficiency of the air conditioner of the invention can further be enhanced. Moreover, the refrigerating device 10 employs $CO_2$ as the refrigerant, thereby being capable of easily obtaining the high-temperature heat source having no combustibility and toxicity for regenerating the adsorbent.

Further, the air conditioner in the embodiment 1 employs the drain water generated by the cooling operation of the evaporator 15 and stored in the drain tank 21 as the water for the humidification at the humidifier 8, thereby being capable of saving water for use in the humidification. Moreover, a water source for humidification can be simplified.

Embodiment 2

Figure 5:
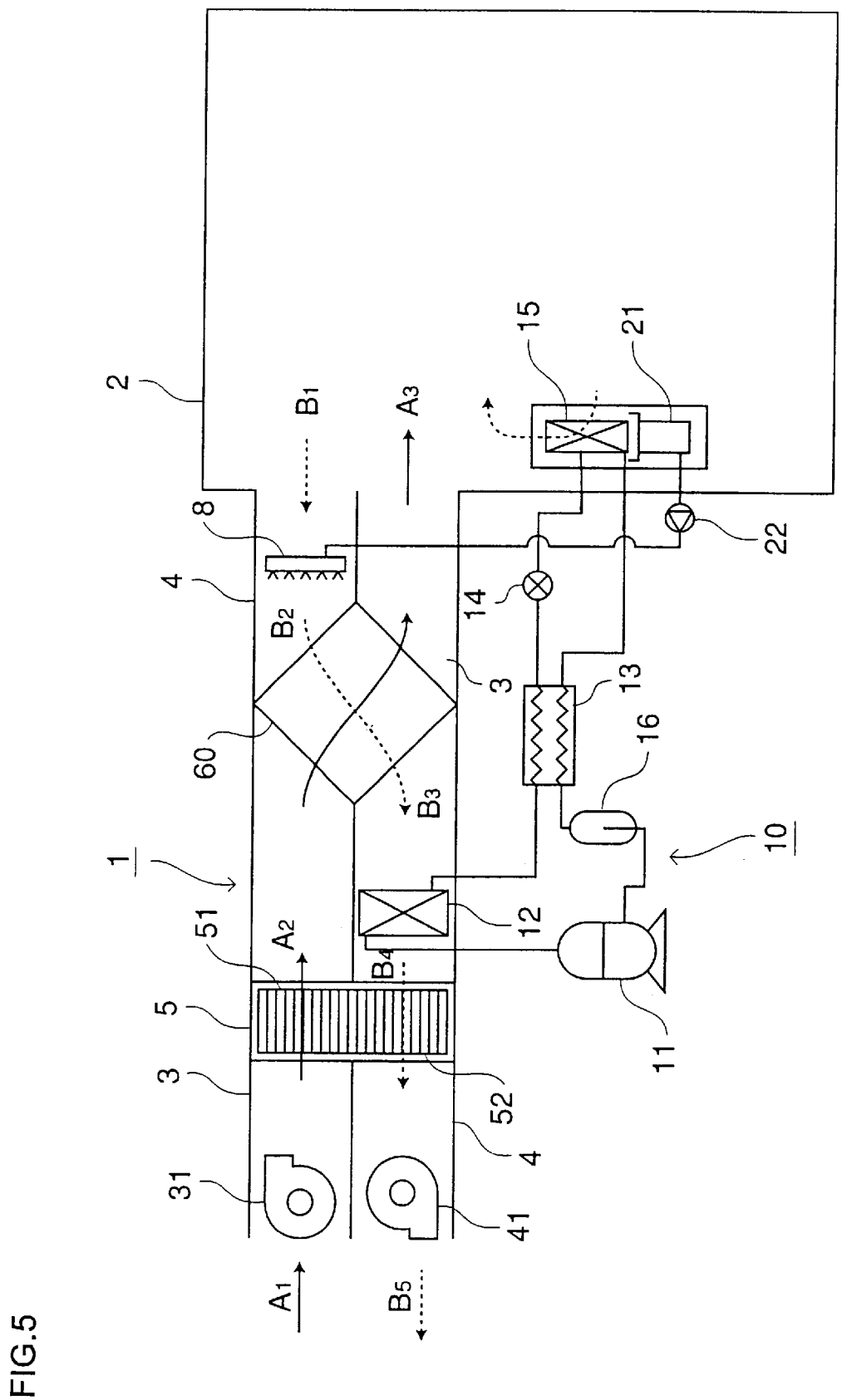
FIG. 5 is a view for explaining a construction of an air conditioner according to an embodiment 2 of the present invention.
Figure 6:
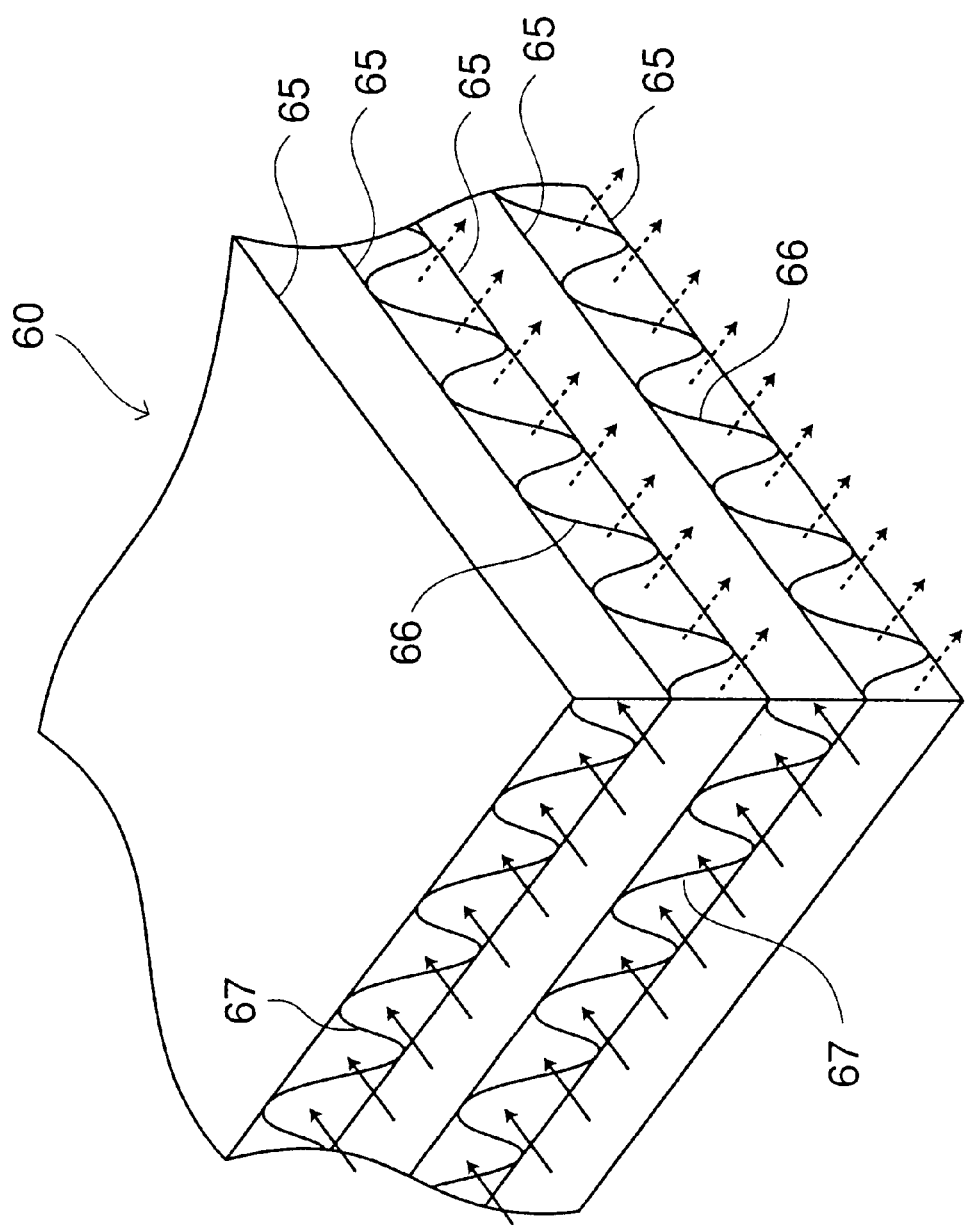
FIG. 6 is a view for explaining a construction of a cross-flow sensible heat exchanger in the air conditioner.

The embodiment 2 will subsequently be explained with reference to FIGS. 5 and 6. FIG. 5 is a view for explaining a construction of an air conditioner according to an embodiment 2 of the present invention and FIG. 6 is a view for explaining a construction of a cross-flow sensible heat exchanger in the air conditioner. It is to be noted that, in these figures, the same elements as those in the embodiment 1 are marked with the same numerals and their explanations are omitted.

In the air conditioner of the embodiment 2, the rotary sensible heat exchanger 6 in the embodiment 1 is replaced with a cross-flow sensible heat exchanger 60 and each speed of rotation of the supply fan 31, exhaust fan 41 and compressor 11 is made variable.

The cross-flow sensible heat exchanger 60 has a construction shown in FIG. 6. Specifically, it has aluminum plate materials 66 and 67 shaped into waveforms arranged between flat aluminum plate materials 65. The aluminum plate materials 66 and 67 shaped into waveforms are arranged such that each direction of the plate materials 66 and 67 is perpendicular to each other every one step. The supply air is passed through a honeycomb hole constructed as described above as shown by solid line arrows, while exhaust air is passed therethrough as shown by broken line arrows, whereby a sensible heat exchange is performed between the outdoor air and the exhaust air via the aluminum plate materials 65, 66 and 67. Since the outdoor air and exhaust air are flown in this way, the air supply passage 3 and air exhaust passage 4 are replaced with each other in front of and behind the cross-flow sensible heat exchanger 60 as shown in FIG. 5.

According to the embodiment 2, the rotational energy required by the conventional rotary sensible heat exchanger is unnecessary by the use of the cross-flow sensible heat exchanger 60, thereby being capable of further enhancing the energy efficiency of the air conditioner.

In the embodiment 2, each rotation of speed of the supply fan 31, the exhaust fan 41 and the compressor 11 is made variable, whereby the cooling capability of the desiccant air conditioner 1 and the refrigerating device 10 can be made variable corresponding to the room cooling load.

The two-stage compressor 11 may be a single-stage compressor in the embodiments 1 and 2. A high energy efficiency is realized by using the two-stage compressor since the high pressure becomes so high by the use of the two-stage compressor.

The refrigerant charged in the refrigerating device 10 is not limited to $CO_2$. Examples of the refrigerant include other natural refrigerants such as hydrocarbon (HC: propane or isobutane), ammonia, air or the like or artificial refrigerants such as HFC, HCFC or the like.

As explained above, an air conditioner of the invention enables to cool a room by a conventionally well-known refrigerating device. Further, an exhaust heat from a high-pressure gas cooling device of this refrigerating device is employed as a heat source for a cooling operation of a desiccant air conditioner. Consequently, an energy efficiency can be made higher than either of a conventional desiccant air conditioner and a refrigerating device (air conditioner) utilizing a refrigerating cycle.

What is claimed is:

1. An air conditioner comprising:

an air supply passage for introducing outdoor air into a room;

an air exhaust passage for exhausting indoor air;

a rotary dehumidifier that is a rotary drum structure having an air passage formed of a material impregnated with an adsorbent, the rotary dehumidifier being arranged such that one half thereof is disposed in the air supply passage for dehumidifying by adsorption a supply air which is the introduced outdoor air and the other half thereof is disposed in the air exhaust passage for regenerating the adsorbent with use of exhaust air which is the exhausted indoor air as a heat source;

a regenerative heater for heating the exhaust air before flowing into the rotary dehumidifier to a temperature required for regenerating the adsorbent of the rotary dehumidifier;

a sensible heat exchanger for causing a sensible heat exchange between the supply air dehumidified at the rotary dehumidifier and the exhaust air before flowing into the regenerative heater; and a refrigerating device operated with a supercritical refrigerating cycle which comprises a high-pressure gas cooling device for cooling a refrigerant in high-pressure side, an expansion valve and an evaporator for cooling the room, wherein an exhaust heat from the high-pressure gas cooling device of the refrigerating device is employed as a heat source of the regenerative heater; and the regenerative heater is the high-pressure gas cooling device of the refrigerating device, and constructed such that the flow of the refrigerant in the high-pressure gas cooling device and the flow of the exhaust air passing through the high-pressure gas cooling device become opposite to each other.

2. An air conditioner according to claim 1, wherein the sensible heat exchanger is a rotary sensible heat exchanger.

3. An air conditioner according to claim 1, wherein the sensible heat exchanger is a cross-flow sensible heat exchanger.

4. An air conditioner according to claim 1, further comprising a humidifier for humidifying the exhaust air before flowing into the sensible heat exchanger.

5. An air conditioner according to claim 1, wherein the refrigerating device comprises a high-pressure gas cooling device for cooling the high-pressure refrigerant under a supercritical pressure.

6. An air conditioner according to claim 1, wherein the refrigerant charged in the refrigerant circuit in the refrigerating device is $CO_2$.

7. An air conditioner according to claim 1, wherein the refrigerating device has high-low-pressure heat exchanger for causing a heat exchange between the high-pressure refrigerant that has already passed through the high-pressure gas cooling device and a low-pressure refrigerant that has already passed through the evaporator.

8. An air conditioner comprising:

an air supply passage for introducing outdoor air into a room;

an air exhaust passage for exhausting indoor air;

a rotary dehumidifier that is a rotary drum structure having an air passage formed of a material impregnated with an adsorbent, the rotary dehumidifier being arranged such that one half thereof is disposed in the air supply passage for dehumidifying by adsorption a supply air which is the introduced outdoor air and the other half thereof is disposed in the air exhaust passage for regenerating the adsorbent with use of exhaust air which is the exhausted indoor air as a heat source;

a regenerative heater for heating the exhaust air before flowing into the rotary dehumidifier to a temperature required for regenerating the adsorbent of the rotary dehumidifier;

a sensible heat exchanger for causing a sensible heat exchange between the supply air dehumidified at the rotary dehumidifier and the exhaust air before flowing into the regenerative heater; and a refrigerating device operated with a refrigerating cycle which comprises a high-pressure gas cooling device for cooling a refrigerant in high-pressure side, an expansion valve and an evaporator for cooling the room, wherein an exhaust heat from the high-pressure gas cooling device of the refrigerating device is employed as a heat source of the regenerative heater; and the humidifier utilizes, as water for humidification, drain water generated by a cooling operation of the evaporator.

9. An air conditioner according to claim 1, further comprising an exhaust fan and a supply fan, and the exhaust fan, the supply fan and a compressor of the refrigerating device each have a variable speed of rotation.

* * * * *